April 26, 1955 A. D. AYRES 2,706,867
FISHING LURE
Filed July 31, 1950
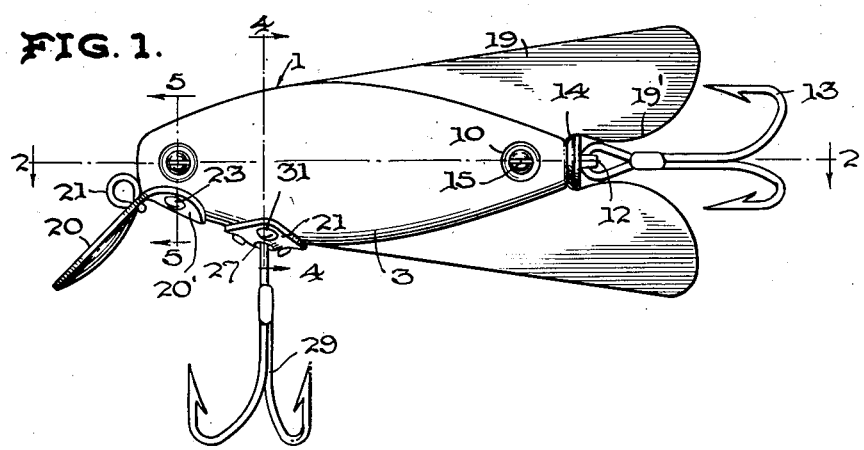
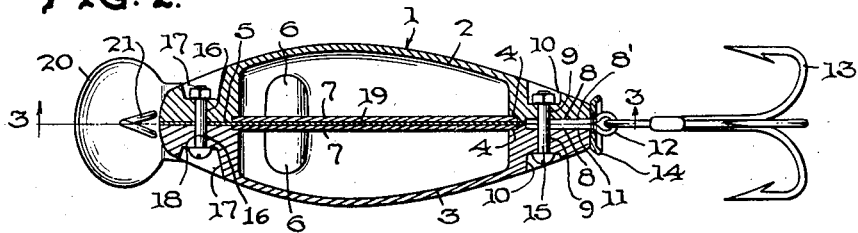
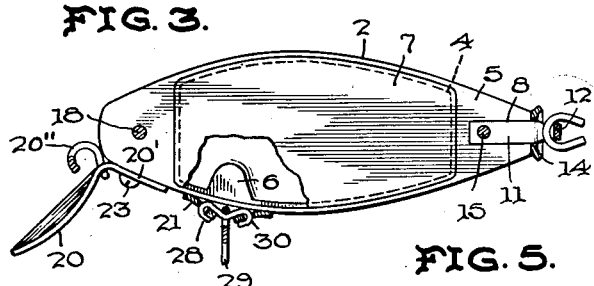
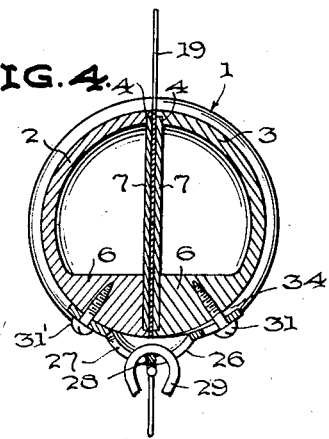
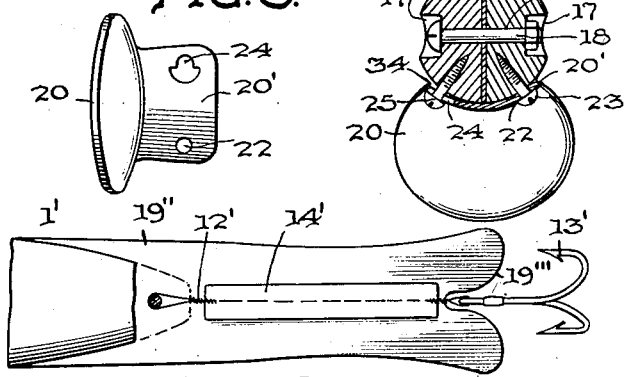
INVENTOR.
A. D. Ayres
BY
Cobb & Cobb
Attorneys

2,706,867

FISHING LURE

Arthur D. Ayres, Marcellus, N. Y.

Application July 31, 1950, Serial No. 176,851

6 Claims. (Cl. 43—42.09)

This invention relates to fishing lures, and more particularly to artificial lures of the so-called "plug" type.

It is well-known among those who resort to fishing as a hobby, or for business purposes, that in some instances and under certain conditions it is desirable to have a lure of the casting plug type provided with variously colored trailing feathers, pork rind strips, or other similar material, which when the plug is being retrieved will more readily attract a fish.

However, it is not always possible or feasible for the fisherman to have a selection of these lures with feathers or other materials of various colors, sizes and/or shapes at his disposal, and it is often bothersome to carry a supply of pork rind strips, since they must be kept in a can or jar in the presence of a liquid to prevent the strips from becoming stiff and useless.

Thus, it is highly desirable to have a lure or plug with which a number of differently colored and/or shaped flexible trailing members may be quickly and easily interchangeably associated, the trailing members being light in weight and compact in bulk.

Accordingly, the primary object of this invention is to provide a fishing lure of the artificial casting plug type, having means for quickly, easily and interchangeably associating therewith flexible trailing tail members of various colors and/or shapes.

Another object of this invention is to provide flexible trailing members of such material as to be light in weight, inexpensive and of very slight bulk.

A further object of the invention is to provide a plug of novel structure which is preferably made in complementary sections, whereby the flexible trailing members may be secured in and released from clamped relationship between the two sections, as may be desired for purposes of interchangeable replacement and/or repair.

A still further object of this invention is to provide novel means for securing the plug sections in clamping engagement with the trailing member, and for permitting of rapid interchanging of different trailing members, or replacement of damaged or soiled ones.

Further objects and advantages of the invention will become apparent from the following detailed description and the accompanying drawing and the novel features thereof defined in the appended claims.

In the drawing:

Figure 1 is a view in side elevation of a fishing lure or plug made in accordance with this invention;

Figure 2 is a view in horizontal section as taken on the line 2—2 of Figure 1;

Figure 3 is a vertical sectional view as taken on the line 3—3 of Figure 2, with a portion of the sealing member broken away;

Figure 4 is a view in transverse section as taken on the line 4—4 of Figure 1, looking in the direction of the arrows;

Figure 5 is a view in transverse section as taken on the line 5—5 of Figure 1, looking in the direction of the arrows;

Figure 6 is a bottom plan view of the shovel nose member of this invention;

Figure 7 is a view in plan of the hook holder and guard of this invention; and

Figure 8 is a fragmentary view of a modified form of plug having a trailing device made in accordance with a variation of the invention.

Like reference characters designate corresponding parts in the several figures of the drawing, wherein 1 generally denotes the lure body which comprises a pair of like, hollow body halves 2 and 3, each of which is preferably molded of suitable plastic material such as "Tenite II," which is the trade name for a cellulose derivative plastic such as cellulose-acetate butyrate. The lure body may, however, be made of any other suitable material having the desired characteristics, without departing from the spirit of this invention.

Each of the body sections 2, 3 is hollow, and is provided with an indented shoulder 4 extending completely around its inner marginal edge, the remainder of the inner side of each section constituting a substantially flat face 5.

In the bottom, and close to the front of each body section, there is provided an enlarged portion 6, the face of which is flush with the shoulder 4, as is best shown in Figure 4.

Suitably positioned in and secured by means of cement or the like to the shoulder 4, and of a thickness as to be flush with the flat faces 5 of the body sections 2, 3, are flat plates or sealing members 7, 7.

When the aforesaid sealing members 7, 7 are applied, they cause each of the hollow sections 2 and 3 to be in effect air-and-water-tight, and therefore buoyant.

At the rear end of each body section 2 and 3, and in the flat face 5, there are provided rectangular, longitudinally extended recesses 8, 8, which are adapted to form a rectangular socket 8' in the tail of the assembled lure body 1, as seen in Figure 2.

The body sections near the rear end thereof are provided with aligned transverse fastener-receiving holes 9, 9, the holes terminating in enlarged sockets 10, 10, the holes 9, 9 intersecting with the socket 8'.

Positioned in the socket 8' is a hook holding or anchoring member 11 of special construction. This hook holding member is preferably formed of a piece of flat sheet metal of a width corresponding to the height of the aforementioned recesses 8 at its opposite ends, and having its central portion of substantially lesser width.

As is apparent in Figure 2, the free ends of the hook fastener member are folded back into juxtaposed relationship to form a relatively narrow hook holding loop or eye 12 for connection with the eye of the hook 13. The free ends of the member 11 pass forwardly through a cup-like member or guard 14 adapted to prevent entanglement of the hook 13 with the forward hook 29 or with the tail member 19. The member 11 is held in the socket 8' by means of the transversely extended bolt 15 which at the same time acts to hold the body sections 2, 3 in closely abutting relationship, as seen in Figure 2.

The bolt head and nut are of such a size as to be completely seated within the confines of the recesses 10, 10 as is apparent in Figs. 2 and 5.

The forward ends of the lure body sections are also provided with aligned bolt-receiving holes 16, 16 having enlarged sockets 17, 17 at their outer ends for accommodating the bolt head and nut of a second transverse bolt 18.

The nuts on the bolts 15 and 18 for holding the body sections together are preferably cemented in place in their respective confining recesses 10 and 17 to obviate accidental loss thereof.

Clamped between the two body sections 2 and 3 is a flexible plastic or other suitable trailing tail 19 which is preferably forked as at 19' at the rear thereof, whereby the trailing hook 13 will remain within the space defined by the fork 19' when the lure is being retrieved. This tail 19 may be of various colors and/or shapes, and has a substantial portion thereof clamped between the body sections, thereby preventing movement of the clamped portion thereof and possible displacement of the tail from the lure body, while the trailing ends of the tail are free to wiggle as the lure is retrieved.

The lure body may be made of transparent material, and therefore take on the color or colors of the various tail pieces that may be clamped therein.

A shovel nose 20 and a ventral hook holder and guard 21 at the forward end of the body are provided with means for permitting separation of the body sections 2 and 3, with facility when the bolts or screws 15 and 18 have been removed.

The spoon section of the shovel nose may be circular in configuration and concavo-convex in section as shown in the drawing, or it may be of any other suitable form as desired. This spoon section is also provided with a pair of holes for accommodating a line attaching loop or eye 20. The portion 20' of the shovel nose which is adapted for connection to the lure body has a hole 22, and a bayonet slot or other elongated opening 24 therein. The shovel nose is secured to one of the body sections by means of a screw 23, or like fastening means. The other body section is provided with a second screw 25 or the like, the head of which is passable through the enlarged portion of the bayonet slot 24, but is impassable through the narrow section thereof, for a purpose to be hereinafter more fully described.

The arcuate ventral hook holder and guard 21 has its central portion bowed downwardly as at 26, the bowed portion 26 having a transversely extended opening 27 therethrough.

Supported within the opening 27, by means of a wire member 28, is a hook 29, the central portion of the wire member 28 lying between the bowed portion 26 of the holder 21 and the lure body 1, and the free ends thereof being passed downwardly through a pair of holes 30 disposed on opposite sides of the transverse opening 27, as best seen in Figures 3 and 4.

As is readily apparent, movement of the ventral hook 29 is limited to the range defined by the opening 27, of my novel hook holding device 21, and accordingly, entanglement of the hook 29 with the shovel nose, the trailing member 19, or with the rear hook 13, is prevented.

The hook holder 21 is secured to the body of the lure by means of a pair of screws or the like 31, 31', the shanks of which are received in the hereinbefore described enlargements or lugs 6, 6 in the respective body sections. The hook holder 21 has a fastener receiving hole 32 and a bayonet slot or other elongated opening 33 cooperable with the screws 31, 31' in the same manner as hereinbefore described in connection with the shovel nose 20.

As is best seen in Figures 4 and 5, the portion 20' of the shovel nose and the ventral hook holder 21 are transversely arcuate on a slightly greater radius than that of the adjacent portion of the body assembly.

In use, if the tail 19 becomes soiled or torn, or if it is desirable to use a tail of a different color and/or shape, it is merely necessary to remove the two bolts 15 and 18, and swing the upper edges of the two body sections open or away from each other. When this is done, the heads of screws 25 and 31, which are never drawn up tight, will swing upwardly through the enlarged openings of the bayonet slots 24 and 33 respectively, thereby effecting complete separation of the body sections 2 and 3, without necessitating complete removal of any of the screws 31, 31' or 23, 25. When the desired tail has been placed between the two body sections, the above procedure is reversed, and the new tail is securely clamped into position on tightening the bolts 15, 18.

By virtue of the fact that the portion 20' of the shovel nose and the hook holder 21 are arcuate in section on a slightly greater radius than their respective adjacent portions of the lure body assembly, it is not necessary to loosen the screws 25 and 31 to effect separation of the assembly due to the slight space, denoted at 34, between the portion 20' and the lure body, and between the hook holder 21 and the lure body. This space 34 permits the heads of these screws to be tilted in the manner of a hinge-like action and slipped through the bayonet slots without loosening the screws. Conversely, the shovel nose 20 and hook holder 21 are held tightly in place by the spring-like tension of these members 20' and 21, when the body assembly is secured together in clamping relation with the tail 19.

The sockets 17, 17 in the lure body section may be colored to represent a fish eye, and the head of the bolt 18 on one side and the nut on the other side may be colored to represent the pupil of the eye.

A modified form of the invention is shown in Figure 8, wherein 1' denotes the lure assembly, which is similar in every respect to the embodiment hereinbefore described, except that in this modified form, I use a substantially longer tail member 19" preferably forked as at 19''', and the tail hook 13' is secured by means of a leader 12', the leader being enclosed between the tail 19" and a strip of tail material 14' or other flexible covering, adhesively or otherwise suitably secured to the tail section 19''.

It is apparent that a large variety of differently colored and/or shaped trailing members may be utilized with my lure bodies whereby the same lure may be changed to suit prevailing circumstances.

The lure of this invention is not only inexpensive from the standpoint of initial cost, but also in upkeep, since when the trailing member becomes soiled or snagged and torn, the lure retains its usefulness by merely applying a new trailing member thereto in the manner hereinbefore described.

It is to be further understood that the size and shape of the lure body may be varied according to preference, and the body may be decorated in any desired manner either by applying surface decorations thereto or by incorporating coloring materials or dyes in the plastic from which the body sections are molded.

While the specific details of my invention have been herein shown and described, changes and alterations may be resorted to without departing from the spirit thereof as defined in the appended claims.

I claim:

1. A fishing lure of the class described, comprising a lure body composed of a pair of separable body sections having surfaces abutting at a central vertical plane of the lure body, means for detachably connecting said body sections together, a flexible trailing tail member releasably clamped between said body sections, fish hook holding means on said lure body, and means rigidly secured to one body section and slidably detachably secured to the other section to allow slight separation of the sections when the first detachable connecting means is removed to facilitate removal and replacement of the tail member.

2. A fishing lure as defined in claim 1, wherein the fish hook holding means includes a fish hook holding element composed of a piece of sheet metal having a central portion reduced in width and defining a fold and having its adjacent ends disposed in juxtaposed relationship, the reduced central portion thereof forming a fish hook eye-engaging loop, said body sections having in their abutting surfaces complemental recesses forming a socket, and the adjacent end of the fish hook holding element being disposed in said socket, a cup-like fish hook guard member mounted on the element aforesaid between the rear of the lure body and the loop aforesaid, and the means for detachably connecting said sections together includes fastening means extending through the lure body, the recess and the portion of the fish hook holding element aforesaid, for holding said element immovable in said socket.

3. A fishing lure as defined in claim 1, wherein the fish hook holding means includes a flexible leader connected to the rear of said lure body, said leader being secured to the flexible trailing tail member aforesaid throughout most of its length, and extending rearwardly of the lure body.

4. A fishing lure as defined in claim 1, wherein the means for allowing slight separation of the sections includes a spoon-shaped member and a screw-fastening means, said spoon-shaped member being fastened on one side to one of the body sections and said screw fastening means being connected to the other of said body sections, and having a bayonet slot in its opposite side cooperative with said screw-fastening means which is secured to the other of said body sections.

5. A fishing lure of the class described, comprising a lure body composed of a pair of separable body sections having surfaces abutting at a central vertical plane of the lure body, means for detachably connecting said body sections together, a flexible trailing tail member releasably clamped between said body sections, means rigidly secured to one body section and slidably detachably secured to the other section to allow slight separation of the sections when the first detachable connecting means is removed to facilitate removal and replacement of the tail member, the means for allowing slight separation of the sections including hook holding means and screw-fastening means, said hook holding means being fastened on one side to one of the body sections and said screw fastening means being connected to the other of said body sections, and said hook holding means having a bayonet slot in its opposite side cooperative with said screw-fastening means which is secured to the other of said body sections.

6. A fishing lure of the class described, comprising a lure body composed of a pair of separable body sections having surfaces abutting at a central vertical plane of the lure body, means for detachably connecting said body sections together, and a flexible trailing tail member releasably clamped between said body sections, fish hook holding means on said lure body, means rigidly secured to one body section and slidably detachably secured to the other section to allow slight separation of the sections when the first detachable connecting means is removed to facilitate removal and replacement of the tail member, the means for allowing slight separation of the sections including screw-fastening means connected to the other of said body sections and an arcuately shaped plate fastened on one side to one of the body sections, and having a bayonet slot in its opposite side cooperative with said screw-fastening means which is secured to the other of said body sections, the radius of curvature of the arcuately shaped plate being slightly greater than the radius of curvature of the lure body at the point of attachment of the plate to the lure body.

References Cited in the file of this patent

UNITED STATES PATENTS

| Number | Name | Date |
|---|---|---|
| 378,691 | Laflin | Feb. 28, 1888 |
| 895,483 | Metcalf | Aug. 11, 1908 |
| 954,691 | Pflueger | Apr. 12, 1910 |
| 963,202 | Bohannan | July 5, 1910 |
| 1,247,935 | Conway | Nov. 27, 1917 |
| 1,296,701 | Sakaue | Mar. 11, 1919 |
| 1,568,325 | Dewey | Jan. 5, 1926 |
| 2,005,985 | Bear | June 25, 1935 |
| 2,036,884 | Reeves | Apr. 7, 1936 |
| 2,187,609 | Larson | June 16, 1940 |
| 2,189,958 | Middlemiss | Feb. 13, 1940 |
| 2,202,519 | Ferris | May 28, 1940 |
| 2,307,200 | Cullerton | Jan. 5, 1943 |
| 2,441,302 | Watkins | May 11, 1948 |
| 2,499,718 | Boshears | Mar. 7, 1950 |
| 2,538,171 | Stroup et al. | Jan. 16, 1951 |